Sept. 15, 1925.  
P. S. GAURIAT  
STORAGE REEL FOR CINEMATOGRAPHIC FILMS  
Filed Feb. 1, 1922

1,553,896

Pierre Sylvain Gauriat
INVENTOR;
By
his Attorney.

Patented Sept. 15, 1925.

1,553,896

UNITED STATES PATENT OFFICE.

PIERRE SYLVAIN GAURIAT, OF PARIS, FRANCE, ASSIGNOR TO PATHE CINEMA, ANCIENS ETABLISSEMENTS PATHE FRERES, OF PARIS, FRANCE.

STORAGE REEL FOR CINEMATOGRAPHIC FILMS.

Application filed February 1, 1922. Serial No. 533,345.

*To all whom it may concern:*

Be it known that I, PIERRE SYLVAIN GAURIAT, citizen of the French Republic, residing at Paris, in the Republic of France, have invented new and useful Improvements in Storage Reels for Cinematographic Films, of which the following is a specification.

The present invention has for its object a storage reel for motion picture films which comprises a rigid box or support provided with a central rotatable core to which one end of the film is permanently secured, said film being provided at a certain distance from said end with a special perforation or a notch by means of which the feeding of the film through the projection apparatus is automatically stopped at the end of the projection before a traction has been exerted upon the part of the film which is secured to the core.

In the accompanying drawing which shows by way of example a form of construction of a storage reel for films according to the invention:

Figure 1:
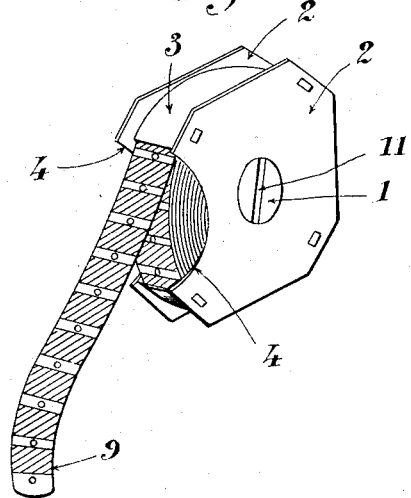
Fig. 1 is a perspective view of the same.
Figure 2:
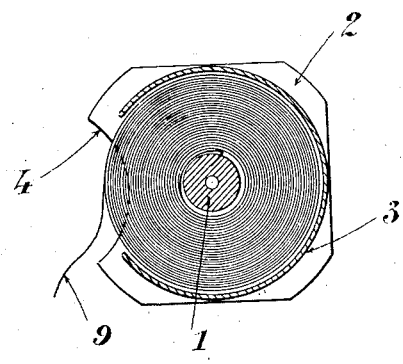
Fig. 2 is a cross section thereof.

As shown in the drawing, the storage reel for films is constituted by a rigid holder or box formed of two cheeks 2 and a cylindrical wall 3 assembled by any desired means. The shape of said box is such that it may be easily secured on a motion picture apparatus. The two cheeks 2 have a lateral notch 4 and the wall 3 is cut away at a corresponding point.

Figure 3:
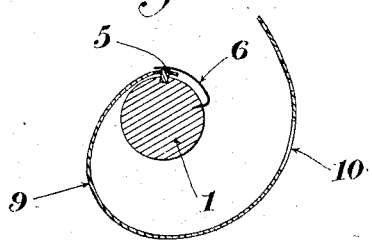
Fig. 3 shows a method of attaching the film to the core of the storage reel.
Figure 4:
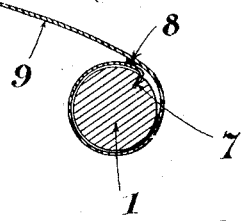
Fig. 4 shows another method for fastening the film.

In the cheeks 2, is rotatably mounted a central core 1. The film 9 is secured at one end to said core in such manner that it cannot be detached therefrom. As shown in Fig. 3, this fastening can be made by means of a spring blade 6 secured to the core and having a pin 5 which extends through a perforation in the film and engages into a recess in the core. According to Fig. 4, the end of the film is inserted into a slit 7 in the core, the film is wound one turn around the core and the two parts of the film which come one upon the other at 8 are cemented together.

The film 9 has at a certain distance from its fastening point on the core 1, a special perforation 10 or is provided with a notch in one of the edges or any other like arrangement whereby the feeding of the film through the projection apparatus is automatically stopped at the end of the projection when the film is almost entirely unwound and before any traction has been exerted on the fastening point of the film upon the core. By this means, the film cannot be torn off the core.

Normally, the bobbin of film projects through the opening in the box corresponding to the notches 4 and the end of the film extends outside of the reel at that point. The core 2 is provided in one of its ends with a diametral slot 11 or the like.

To re-wind the film in the storage reel, it will suffice to rotate the core 1 by means of a rotating member engaging into said slot 11.

The main advantages afforded by this storage reel are as follows:

The film never leaves its box, it being invariably secured to the core, so that it will never be in disorder and cannot become unrolled by itself as occurs with ordinary reels. It is unwound as in the case of usual reels and it may be easily re-wound without the operator being obliged to secure again the end of the film to the core.

The reel and film remain always connected together, and this affords the facility of placing the title of the film in a very apparent manner upon the cheeks 2 of the box, this permitting the operator to proceed without any confusion and to choose without hesitation the subject which he desires.

It will also be observed that the aperture 4 permits in all cases to readily bring the free end of the film to the exterior; if this end is situated within the holder at a point where it cannot be reached, it will suffice to act upon the part of the bobbin of film projecting in the aperture in order to turn the same until the end of the film shall appear at the aperture where it may be seized.

Having now described my invention, what I claim as new and desire to secure by Letters Patent is:

1. A storage reel for toy motion picture apparatus comprising a rigid, independent closed box with nondismountable solid walls, a central core rotatably and unremovably mounted in said box, means provided on said core and whereby the latter is adapted to be rotated, a motion picture film the inner end whereof is fastened directly and permanently to said core, and a lateral cut away portion on said box through which said film may extend.

2. A storage reel for toy motion picture apparatus comprising a rigid, independent closed box with nondismountable solid walls, a central core rotatably and unremovably mounted in said box, means for controlling the movement of said core in said box, a motion picture film the inner end whereof is fastened directly and permanently to said core, said film being provided near said inner end with an elongated slot whereby the feeding of the film is automatically stopped at the end of the projection, and a lateral cut away portion on said box through which said film may extend.

3. A storage-reel for toy motion picture apparatus comprising a rigid, independent closed box with nondismountable solid walls, a central core rotatably and unremovably mounted in said box, means provided on said core and whereby the latter is adapted to be rotated, a motion picture film, a spring blade secured to said core, a suitable opening provided at the inner end of the film, a stud on said spring blade adapted to engage said suitable opening, said film being provided with said inner end with an elongated slot whereby the feeding of the film is automatically stopped at the end of the projection, and a lateral cut away portion on said box through which said film may extend.

In testimony whereof I have signed my name to this specification.

PIERRE SYLVAIN GAURIAT.